United States Patent [19]

Premiski et al.

[11] Patent Number: 5,725,013
[45] Date of Patent: Mar. 10, 1998

[54] BUSH INSERT WITH ORIFICE FOR A LIQUID-CONTAINING HOUSING

[75] Inventors: Vladimir Premiski, Zuelpenich-Buervenich; Mark Silk, Cologne, both of Germany

[73] Assignee: Ford Global Technology, Inc., Dearborn, Mich.

[21] Appl. No.: 559,665

[22] Filed: Nov. 20, 1995

[30] Foreign Application Priority Data

Dec. 16, 1994 [DE] Germany .............. 44 44 773.6

[51] Int. Cl.$^6$ .................................................. F16K 27/00
[52] U.S. Cl. .................. 137/454.2; 137/516.25; 137/517; 137/539; 251/118
[58] Field of Search ........................ 251/118; 137/517, 137/516.25, 539, 454.2, 454.5, 454.6

[56] References Cited

FOREIGN PATENT DOCUMENTS

| 1607867 | 3/1979 | Germany . |
| 2227555 | 11/1987 | Germany . |
| 2063890 | 7/1992 | Germany . |

*Primary Examiner*—Stephen M. Hepperle
*Attorney, Agent, or Firm*—Frank G. McKenzie

[57] ABSTRACT

In a bush insert with an orifice for a liquid-containing housing, which is insertable as a bush (22) in a passage opening (21) in the housing (3), includes an orifice (25) in its base, the base of the bush insert (22') is formed as a cone (29) pointing counter to the direction of flow (P') of the liquid and having the orifice (31) located in its tip (30).

3 Claims, 2 Drawing Sheets

BUSH INSERT WITH ORIFICE FOR A LIQUID-CONTAINING HOUSING

BACKGROUND OF THE INVENTION

1. Technical Field

The invention relates to a bush insert with an orifice for a liquid-containing housing which is insertable as a bush in a passage opening in a housing and has an orifice in its base.

2. Prior Art

From German patent 16 07 867, a bush insert with an orifice for a fluid-containing housing, in this case a vessel or a bottle, is known, which is insertable in a self-locking manner in a passage opening to restrict the flow of liquid through it.

Bush inserts with orifices of similar construction are used inside transmission housings in order not to have to make orifices of specific small sizes in the relatively thick material of the transmission housing (see, for example, German Offenlegungsschrift 22 27 555, FIG. 1B, near the reference numeral 92).

Such bush inserts with orifices are used inside transmission housings in order to direct circulating pressure lubricants specifically into particular regions of the transmission housing where there is a special need for lubricant or coolant.

These known bush inserts with an orifice, which are conventionally formed as small bush-shaped or hat-shaped metal pressings, in the base of which the small orifice is formed, have the disadvantage that particles of dirt tend to accumulate in their interior, which are necessarily carried along to the orifice and cause trouble by clogging it.

SUMMARY OF THE INVENTION

It is an object of the invention to improve a bush insert with an orifice of the kind referred to so that the accumulation of particles of dirt inside the bush insert no longer leads to interference with the flow of liquid through the orifice.

According to the invention, the object is achieved by forming the base of the bush insert as a cone pointing opposite the direction of flow of the liquid and by forming the orifice in the tip of the cone.

By this means, particles of dirt which arrive in the vicinity of the orifice are led off laterally outwards, where they can accumulate in the calm region at the base of the cone. In this way, premature clogging of the small-sized orifice is reliably avoided.

In further embodiments of the invention, in which the insert performs a pressure control function as well as a dirt-collecting function, the bush insert receives a spring-loaded ball, is provided at the opposite end to the cone with a first valve seat formed by a flange, and constitutes an excess pressure valve. The base of the bush insert may be provided with an internal cuff in which the orifice is located and on which a further valve seat for the ball of the spring-loaded excess pressure valve is formed, thus forming a pressure range ball valve.

BRIEF DESCRIPTION OF THE DRAWINGS

The invention will now be described in more detail, by way of example, with reference to three embodiments shown in the drawings, in which.

DETAILED DESCRIPTION OF PREFERRED EMBODIMENTS

Figure 1:
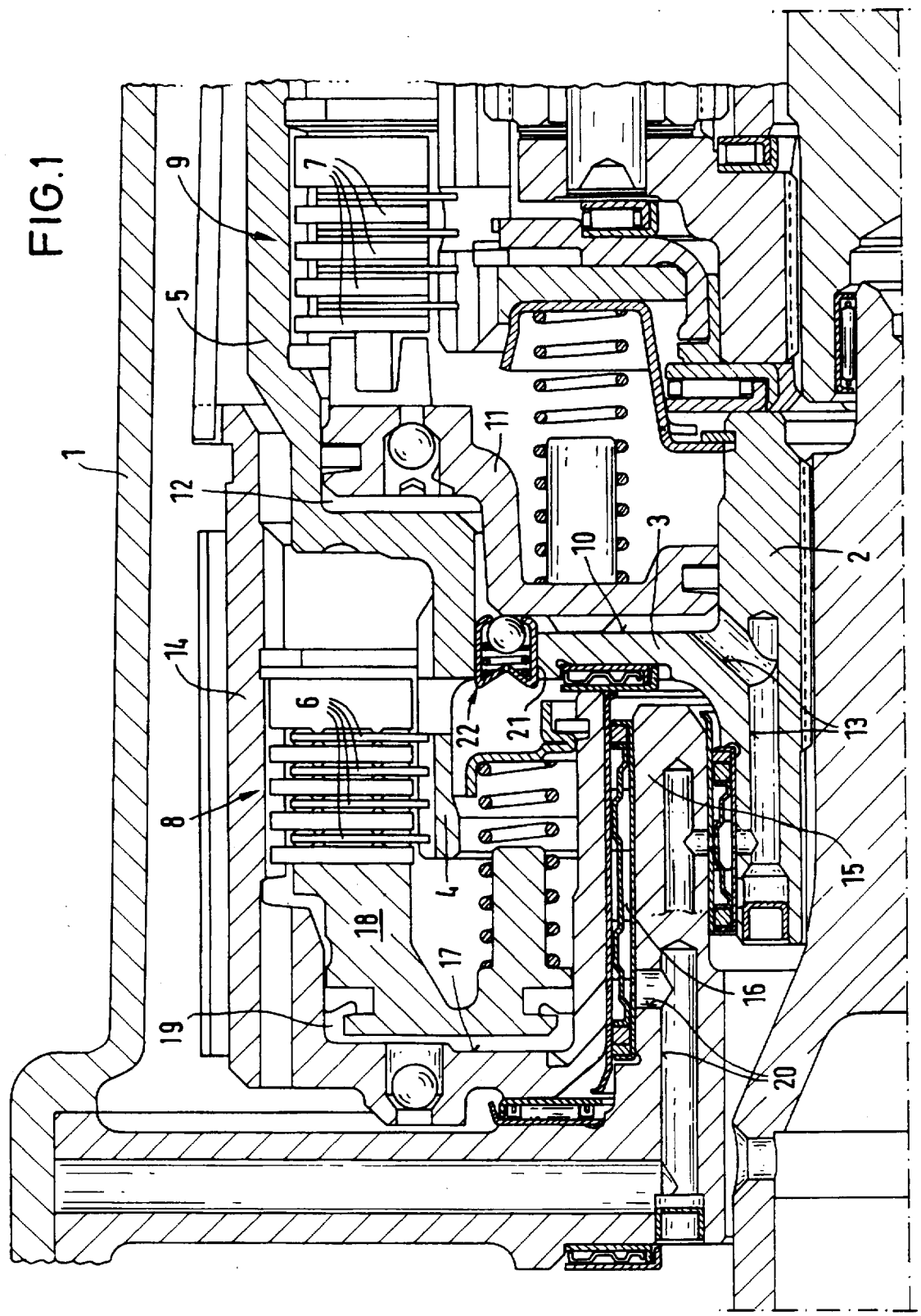
FIG. 1 is a partial vertical section through the multiplate clutch region of an automatic transmission for an automobile, in which the bush insert with orifice of the invention can be used for distribution of the pressure lubricant.

FIG. 1 shows, in a transmission housing 1, components of an automatic transmission of an automobile which will only be described to the extent necessary to understand the invention. A component 2, depicted as a clutch carrier, has a radial middle wall 3 and drum-shaped cylinder parts 4 and 5, which respectively form the inner holding member for inner clutch plates 6 and the outer holding member for outer clutch plates 7 of two multiplate clutches 8 and 9.

The clutch carrier 2 forms a cylinder 10 for an actuating piston 11 for the multiplate clutch 9.

The actuating pressure chamber 12, formed by the cylinder 10 and the piston 11, is pressurized with hydraulic fluid through supply channels 13 disposed in the clutch carrier 2, in order to engage the multiplate clutch 9. The multiplate clutch 9 is a so-called forward gear clutch, which is engaged to engage the forward gears, but is then not shifted anymore during normal driving.

The multiplate clutch 8 is located at the front of the clutch carrier 2, and includes a drum member 14 which is supported rotatably mounted at its inner circumference on a so-called center support 15 by means of a needle bearing assembly 16.

The drum member 14 forms a cylinder 17 which receives a piston 18 for actuation of the multiplate clutch 8. The hydraulic fluid actuating chamber 19 is pressurized with hydraulic fluid through channels 20.

The multiplate clutch 8 is a clutch which is more frequently actuated during the different gear-shifts while the vehicle is being driven, and is consequently heavily thermally loaded by frequent engagement and disengagement sequences. For this reason, an adequate amount of pressurized lubricant must be supplied to the clutch plates 6 for cooling. In order to ensure that in the region radially inside the clutch plates 6 hydraulic fluid is available in sufficient amount and correctly directed, a passage 21 is provided through the middle wall 3 of the clutch carrier 2 in which a bush insert 22, in accordance with the invention, is inserted which taps off hydraulic fluid from the hydraulic fluid actuating chamber 12.

The exact form of the bush insert, in accordance with the invention, will now be described in more detail in connection with FIGS. 2, 3, 4 and 5.

Figure 2:
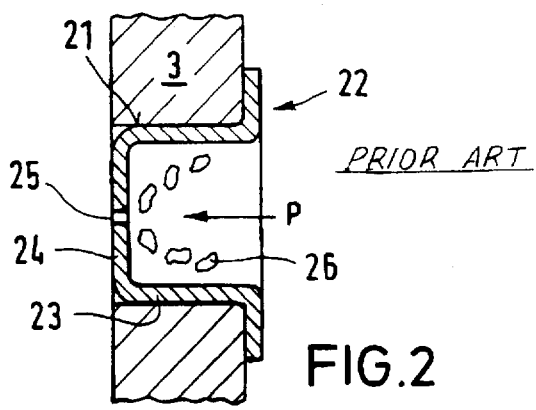
FIG. 2 is a section through a conventional bush insert with an orifice.

FIG. 2 shows the conventional form of a known bush insert 22 with an orifice, which has hitherto been formed as a simple sheet metal pressing 23 in the form of a hat with an orifice 25 formed in its base 24. The direction of flow is shown by the arrow P, and the particles of dirt that accumulate are indicated by 26.

The bush insert 22' with an orifice in accordance with the invention, shown in FIG. 3, is again in the form of a simple sheet metal pressing 27 in the form of a hat, the base of which is shaped as a cone 29, in the tip 30 of which the orifice 31 is located. The direction of flow of the hydraulic fluid is again given by the arrow P', and the accumulating dirt particles are indicated by 26'.

It is easy to see that through the location of the orifice 31 in the tip 30 of the cone 29, in accordance with the invention, a self-cleaning effect for the narrow orifice is obtained, which ensures that the functioning of the orifice is maintained throughout the whole life of the transmission.

Figure 3:
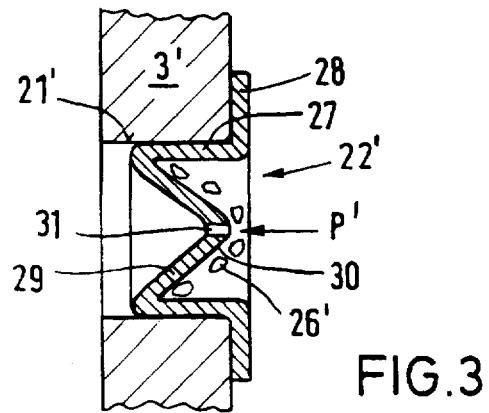
FIG. 3 is a section through a bush insert with an orifice in accordance with the invention.

Basically, a bush insert 22' with an orifice in accordance with the invention, as shown in FIG. 3, can be fitted in the through-passage 21, shown in the middle wall 3 of the clutch carrier 2 of FIG. 1. However, on pressurizing the forward gear clutch 9, this would lead to delay in its engagement, which is undesirable.

Figure 4:
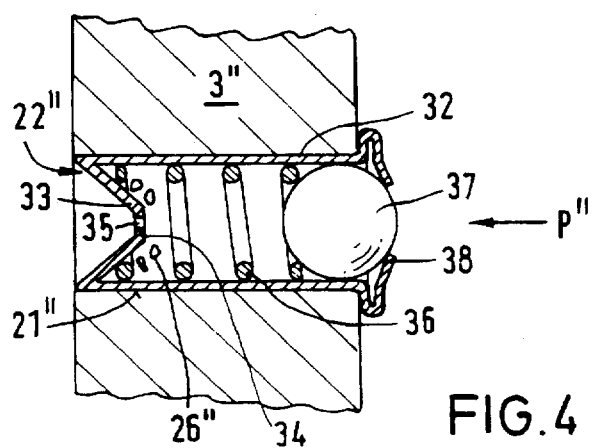
FIG. 4 is a section through a bush insert of the invention with both an orifice and pressure control means.

In order to avoid this disadvantage, the bush insert 22" with an orifice in accordance with the invention is used in the embodiment shown in FIG. 4. This embodiment is shown in FIG. 1, where it is indicated by 22.

The bush insert 22" with an orifice again comprises a bush 32, the base of which is formed as a cone 33 having the orifice 35 in its tip 34.

The bush 32 also contains a helical compression spring 36 and a ball 37, which cooperates with a valve seat 38 formed by a flange.

Consequently, the bush insert 22" with an orifice can be used to let hydraulic fluid through from the pressure side, indicated by the arrow P", only when this pressure exceeds a specified value.

As soon as a specified pressure is exceeded, the force of the spring 36, which acts on the ball 37, is overcome and hydraulic fluid is allowed to flow through the bush 22". At the orifice 35, dirt particles are again, as already indicated in FIG. 3, turned away toward the outer rim.

However, with the bush insert 22" shown in FIG. 4, difficulties can arise in a particular operating condition of the forward gear clutch, the so-called "stalled condition". Then, the very high pressure required to actuate the forward gear clutch is impaired by the outflow of hydraulic fluid.

Figure 5:
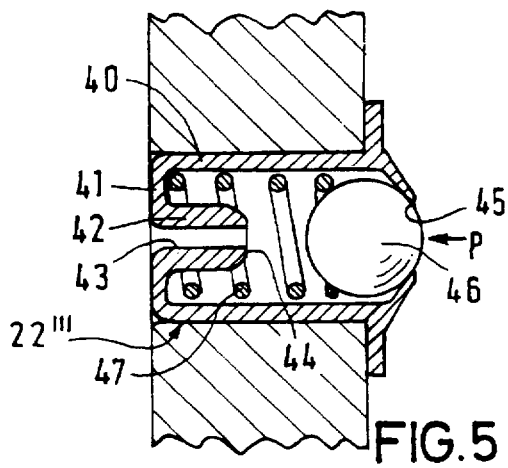
FIG. 5 is a section through a bush insert in accordance with the invention with a particular pressure control function.

In order to avoid these difficulties, the bush insert 22''' shown in FIG. 5 is used. The bush insert 22''' again has a bush portion 40 in the form of a hat, the base of which has an internal cuff 42, for example, conically shaped, in which the orifice 43 is located and on which a second valve seat 44 is formed.

The other end of the bush insert 22''' exhibits the first valve seat 45 for the ball 46 located in the bush insert 22''', which is loaded by a helical compression spring 47.

Through the second valve seat 44 on the internal cuff 42, the flow of hydraulic fluid through the orifice 43, which, as in the embodiment of FIG. 4, is released above a specified hydraulic fluid pressure by the ball lifting from the first valve seat, is prevented when the very high pressure occurs in the "stalled condition" by the ball seating on the second valve seat, so that no impairment of the capacity of the forward gear clutch occurs.

For the sake of completeness, it is pointed out that other embodiments of a bush insert with an orifice in accordance with the invention are possible, and, in particular, such inserts may be formed by turning from aluminum or brass or as injection moldings of plastic material.

What is claimed is:

1. A valve for controlling fluid flow, comprising:

a bush insert located in a passage opening, the bush having a wall defining a chamber extending at least partially through said passage opening, and a base formed as a cone, whose apex extends away from the base into the chamber and spaced from the wall; and an orifice formed in said base and located at the apex of the cone.

2. A valve for fluid flow comprising:

a bush insert located in a passage opening, the bush having a wall extending at least partially through said a passage opening, and a base formed as a cone, whose apex is directed toward the liquid in said housing and spaced from the wall;

an orifice formed in said base and located at the apex of the cone;

a first valve seat located at an end of the bush insert opposite the orifice;

a ball located within the bush insert adjacent the wall, between the first valve seat and orifice;

a spring located within the insert, urging the ball toward the first valve seat.

3. A valve for controlling, fluid flow comprising:

a bush insert located in a passage opening, the bush insert having a wall defining a chamber extending at least partially through said passage opening, and a base formed with an internal cuff extending from the base of the bush insert into the chamber, the cuff formed with an orifice and defining a valve seat; a second valve seat located in the chamber and spaced from the valve seat a ball located within the bush insert adjacent to the wall, and adapted to move between the valve seat and second valve seat;

a spring located within the bush insert, urging the ball toward the first valve seat the valve seat adapted to receive the ball thereon and to close the orifice against passage of fluid therethrough.

* * * * *